United States Patent [19]
Remery

[11] 3,978,390
[45] Aug. 31, 1976

[54] DC-AC INVERTER FOR SUPPLYING A DISCHARGE LAMP

[75] Inventor: Michel Remery, Evreux, France

[73] Assignee: U.S. Philips Corporation, New York, N.Y.

[22] Filed: June 24, 1975

[21] Appl. No.: 589,764

[30] Foreign Application Priority Data
July 3, 1974 France .................................. 74.23127

[52] U.S. Cl. ............................... 321/44; 315/241 P; 315/209 R; 331/112
[51] Int. Cl.² ........................................ H02M 7/537
[58] Field of Search ....... 315/209 R, 241 P, DIG. 5, 315/DIG. 7; 321/2, 43, 44; 331/112

[56] References Cited
UNITED STATES PATENTS

| 3,061,795 | 10/1962 | Byrd et al. ...................... 331/112 X |
| 3,387,147 | 6/1968 | Radwan .......................... 331/112 X |
| 3,710,231 | 1/1973 | Baker ............................. 321/2 X |
| 3,906,251 | 9/1975 | Tanida et al. ................... 321/2 X |

*Primary Examiner*—William M. Shoop
*Attorney, Agent, or Firm*—Frank R. Trifari; Bernard Franzblau

[57] ABSTRACT

A relaxation circuit effects the drive of a blocking invertor for supplying a discharge lamp, thus enabling this invertor to operate in a wide range of the electric input voltage while the whole arrangement has a high efficiency.

4 Claims, 1 Drawing Figure

U.S. Patent  Aug. 31, 1976  3,978,390
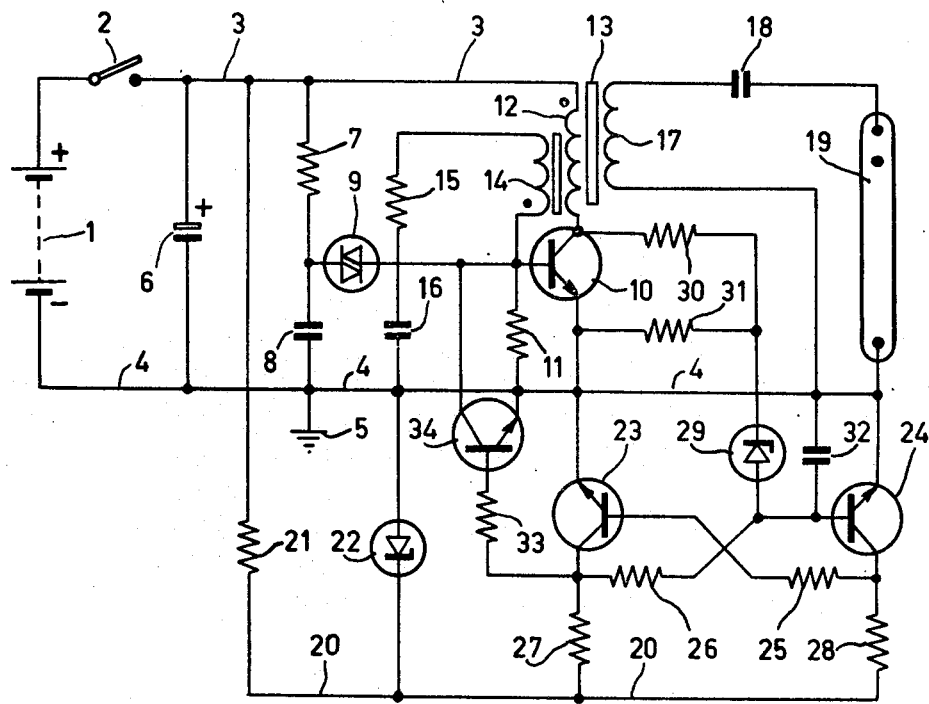

DC-AC INVERTER FOR SUPPLYING A DISCHARGE LAMP

The invention relates to a DC-AC invertor for supplying a discharge tube, which invertor is provided with a first transistor which is connected to a transformer having at least a primary winding, a secondary winding and a coupling winding.

Such a device may, for example, be used to illuminate the interior of railway carriages. These carriages receive their electric energy, for example, from a set of batteries. The electric systems of such carriages must satisfy stringent regulations. For example, for a nominal battery voltage of, for example, 72 Volts the operation of the device will have to be ensured for a voltage range extending from 56 Volts to 100 Volts at an ambient temperature which may vary between −20°C and +50°C.

There are two main systems of DC-AC invertors, namely on the one hand the self-oscillating circuits, starting of which is ensured by a simple resistor or by a resistor working in conjunction with a diode, and on the other hand the circuits which are provided with a low power auxiliary oscillator, driver and a power stage which is generally of a symmetrical construction. The self-oscillating circuits have the advantage that they are comparatively simple; but they have the disadvantage that their efficiency is low which is not compatible with reliable operation in a wide supply voltage range and at extreme ambient temperatures.

On the other hand the circuits including auxiliary oscillators have an efficiency which is good. However, these circuits are complicated, which implies that their manufacturing costs are high.

Furthermore, said inverters must be provided with safety systems which protect these invertors from deficiencies and from possible deviating properties of the discharge tubes used, for example, fluorescent tubes. The said safety systems result, for example, in switching to no-load when the said tubes refuse to ignite.

It is an object of the invention to provide a DC-AC inverter of simple and cheap construction which has a high efficiency.

A second object of the invention is to make the invertor less sensitive to deficiencies of the discharge tube which is fed by the invertor.

For that purpose a DC-AC inverter according to the invention for supplying a discharge tube, which invertor is provided with a first transistor which is connected to a transformer having at least a primary winding, a secondary winding and a coupling winding is characterized in that the base electrode of the first transistor, is connected via a first threshold element to the junction of a resistor and a capacitor which are connected in series. This series circuit has a small time constant and is connected between DC supply conductors of the invertor. The collector of the first transistor is connected via the second threshold element to a control electrode of a bistable auxiliary circuit, an output electrode of which is connected via an auxiliary transistor to the base of the first transistor. A second capacitor is connected between the aforementioned control electrode of the auxiliary circuit and a conductor which connects the emitters of two transistors of said auxiliary circuit.

The second threshold element is preferably a Zener diode connected to a voltage divider, which is formed by resistors and is connected between the collector and the emitter of the first transistor.

The invertor according to the invention operates as a blocking oscillator which is driven by means of a relaxation circuit which is formed, on the one hand, by the low time constant network and on the other hand by the first threshold element which is, for example, a "diac", so that said invertor is highly insensitive to strong fluctuations in the DC supply.

Futhermore, because the power consumed by the relaxation circuit is very small relative to the total power consumed by the invertor, an energy efficiency is possible which is particularly high and which is very favourable to reliable operation of the invertor at high ambient temperatures.

The bistable auxiliary circuit immediately blocks the operation of the invertor via the auxiliary transistor - as soon as an unusually high voltage due to no-load operation occurs at the collector of the first transistor.

The invention will be further explained with reference to the accompanying drawing the sole FIGURE of which shows a circuit diagram of an inverter according to the invention.

In the drawing the positive terminal of the set of accumulators 1 is connected to one of the contacts of a single pole switch 2, whose other contact is connected to a first supply conductor 3 which has a positive polarity. The negative terminal of the accumulators 1 is connected to a second supply conductor 4, which has a negative polarity and is connected to a common ground 5. A decoupling capacitor 6 is connected between the two supply conductors 3, 4, which is also the case with a R-C network of small time constant, which consists of a resistor 7 (connected to the positive conductor 3) and a capacitor 8 (connected to the negative conductor 4), these components 7 and 8 being connected in series.

A first threshold element, constructed as "diac" 9, is connected between the junction of the resistor 7 and the capacitor 8 and the base of a first npn oscillator transistor 10, which base is also connected to the negative conductor 4 via a resistor 11. The emitter of the transistor 10 is directly connected to the negative conductor 4, while its collector is connected to the positive conductor 3 via the primary winding 12 of a transformer 13.

One of the ends of a coupling winding 14 of said transformer 13 is connected to the base electrode of the transistor 10, while the other end of said winding is connected to the negative conductor 4 via a resistor 15 and a capacitor 16 connected in series.

One end of the secondary winding 17 of the transformer 13 is directly connected to the negative conductor 4 while the other end is connected to one of the electrodes of a discharge tube 16 via a ballast capacitor 18. The other electrode of said tube 16 is connected to the negative conductor 4.

Supplying a safety circuit of the invertor according to the invention is effected via a positive conductor 20 which is connected to the positive conductor 3, via a resistor 21, and also to the cathode of a Zener diode 22 while the anode of this diode is connected to the negative conductor 4.

The cross-connection between the base electrodes and the collector electrodes of two npn transistors 23 and 24 is effected via two resistors 25 and 26 while the emitter electrodes of these transistors 23, 24 are furthermore directly connected to the negative conductor 4. Their collector electrodes are connected to the positive conductor 20 via a resistor 27 and resistor 28 respectively.

The base electrode of the transistor 24, which electrode is the control electrode of the bistable auxiliary circuit, is connected to the anode of a Zener diode 29 whose cathode is connected to the collector of the transistor 10 via a resistor 30 and also to the emitter of the transistor 10 via a resistor 31. Furthermore, a capacitor 32 is connected between the base and the emitter of the transistor 24.

The collector electrode of the transistor 23, which electrode is an output electrode of the bistable auxiliary circuit, is connected via a resistor 33 to the base electrode of an npn-transistor 34, whose emitter is directly connected to the negative conductor 4 and whose collector is connected to the base of the oscillator transistor 10.

The invertor described operates as follows: After the switch 2 has been closed, the capacitor 8 is charged via the resistor 7 to a voltage which is equal to the threshold voltage of the element 9. At that instant the capacitor 8 discharges partly via the base-emitter junction of the transistor 10, which causes this transistor to become conducting, whereby a current is increased in the winding 12 of the transformer 13. This variation of the current produces a voltage across the terminals of the coupling winding 14, which is connected to the transistor base, in a manner such that the amplitude of the collector current is still further increased. This doubleacting effect results in rapid saturation of the transistor 10. Then, owing to the absence of a variation of the current the voltage between the terminals of the coupling winding 14 is reduced to zero, and the transistor 10 is again blocked etc. Described here is an invertor of the blocking type in which the drive is supplied by a relaxation circuit formed by the resistor 7, the capacitor 8 and the threshold element 9. As the power consumed by the relaxation circuit is very small, the efficiency of the invertor is relatively high.

The discharge tube 19 is supplied by the secondary transformer winding 17 via a ballast capacitor 18. This capacitor 18 serves to stabilize the discharge current in the tube (lamp) 19.

In case a short circuit is produced between the electrodes of the tube 19, oscillation is stopped. Oscillation starts again when the voltage across the terminals of the winding 17 increases. This results in a relaxation phenomenon of a relatively low frequency. As a rule this does not lead to damage to the invertor.

Furthermore, the safety circuit prevents the invertor from breaking down if the tube 19 should refuse to ignite, for example, due to a defect in the tube electrodes or due to a leak in the discharge tube. Without such a safety circuit the no-load-operation of the invertor would give rise to an increase in the oscillation frequency and a simultaneous increase in the voltage across the terminals of the transformer windings, which might result in damage to the transistor 10 due to breakdown. Even if this did not occur the presence of a voltage of about 2kV across the terminals of the discharge tube entails the risk of electric shocks which may be dangerous for the personnel charged with replacing such a tube.

Such a situation is avoided by the presence of the bistable circuit with the transistors 23 and 24. At the instant that a voltage is supplied to the invertor the presence of the capacitor 32 causes the bistable auxiliary circuit to be adjusted to such a state that the transistor 23 is saturated and the transistor 24 is blocked. As a result the transistor 34 is also blocked, which permits immediate starting of the invertor. If, however, for some reason or other the winding 17 carries no voltage, the resulting increase in the collector voltage of the transistor 10 is sufficient to exceed the threshold voltage of the Zener diode 29 whose cathode is connected to the voltage divider formed by the resistors 30 and 31. At this instant the transistor 24 becomes saturated, causing the transistor 23 to block. This causes the transistor 34 to become saturated and produces a short-circuit of the base to the emitter of the transistor 10 which immediately stops the operation of the invertor. After the tube 19 has been replaced it is necessary to open the switch for some seconds to enable the invertor to become operative again. The supply voltage of the safety system is stabilized by the Zener diode 22 which is connected to the resistor 21.

The invertor described by way of example is used to supply a low pressure mercury vapour discharge lamp which is provided with non-preheatable electrodes. However, the invertor can also be used to supply discharge lamps having preheatable electrodes. In that case the transformer 13 must be provided with heater current windings suitable for this purpose.

An embodiment of the described arrangement according to the invention comprises the circuit elements specified below:

| | |
|---|---|
| Transistor 10 | BDY 28 B |
| Transistors 23–24 | BC 407 |
| Transistor 34 | BFY 50 |
| Threshold element 9 | BR 100 |
| Zenerdiode 22 | BZY 88 24 V |
| Zenerdiode 29 | BZY 88 10 V |
| Resistor 7 | 22 k $\Omega$ |
| Resistor 11 | 56 $\Omega$ |
| Resistor 15 | 27 $\Omega$ |
| Resistor 21 | 5.6 k $\Omega$ |
| Resistors 25–26 | 10 k $\Omega$ |
| Resistor 27 | 2.2 k $\Omega$ |
| Resistor 28 | 10 k $\Omega$ |
| Resistor 30 | 56 k $\Omega$ |
| Resistor 31 | 2.7 k $\Omega$ |
| Resistor 33 | 2.2 k $\Omega$ |
| Capacitor 6 | 100 $\mu$F |
| Capacitor 8 | 4.7 nF |
| Capacitor 16 | 330 nF |
| Capacitor 18 | 5 nF |
| Capacitor 32 | 27 nF |
| Transformer 13 | ferrite core 3C8-E42×21×15 |
| Winding 12 | 35 turns |
| Winding 14 | 2 turns |
| Winding 17 | 225 turns |
| Tube 19 | low pressure mercury vapour discharge lamp 40 W. |
| Average oscillator frequency | about 20 kHz. |

The Table which follows hereafter specifies, as a function of the battery voltage (V$b$) supplied to the invertor, the variation in current (I$b$) of the voltage source, the variation in current of the tube 19 (IT), the variation in power consumption (P) of the tube and the variation in energy efficiency ($\eta$).

TABLE

| Vb (V) | 56 | 72 | 80 | 90 | 100 |
|---|---|---|---|---|---|
| Ib (mA) | 510 | 510 | 510 | 510 | 490 |
| IT (mA) | 210 | 290 | 330 | 380 | 420 |
| P (W) | 26 | 33 | 36 | 40 | 42 |

TABLE-continued

| β % | 89 | 89 | 89 | 87 | 86 |
|---|---|---|---|---|---|

It can be ascertained that the energy efficiency of the invertor at the nominal voltage of the voltage source is about 90 %. This fact, combined with the fact that the lumen/watt value of a low pressure mercury vapour discharge lamp is, as a rule, higher in the case where the lamp is fed by a high-frequency current than when it is fed by a 50Hz current, will make it clear that the described arrangement has great advantages.

What is claimed is:

1. A DC-AC invertor for supplying a discharge tube comprising, a first transistor connected to a transformer having at least a primary winding, a secondary winding and a coupling winding, means connecting the base electrode of the first transistor via a first threshold element to the junction of a resistor and a capacitor which are connected in a series circuit having a small time constant, means connecting said series circuit between DC supply conductors of the invertor, means connecting the collector of the first transistor via a second threshold element to a control electrode of a bistable auxiliary circuit having an output electrode connected via an auxiliary transistor to the base of the first transistor, means connecting a second capacitor between said control electrode of the auxiliary circuit and a conductor which connects the emitters of two transistors of said auxiliary circuit.

2. An invertor as claimed in claim 1, characterized in that the second threshold element comprises a Zener diode.

3. An invertor as claimed in claim 2 comprising means connecting one of the electrodes of the Zener diode to a voltage divider which is formed by resistors connected between the collector and the emitter of the first transistor.

4. An invertor as claimed in claim 1 further comprising, means connecting the collector of said first transistor to one of said DC supply conductors via said primary winding and the emitter of the first transistor to the other one of said DC supply conductors, means connecting the coupling winding between the base and emitter of the first transistor, and means connecting the secondary winding to the discharge tube.

* * * * *